United States Patent Office 3,657,303
Patented Apr. 18, 1972

3,657,303
SILOXANE-MODIFIED UREA DERIVATIVES
Hans Dietrich Golitz, Cologne-Stammheim, Eberhart Degener, Leverkusen, and Gunter Oertel, Cologne-Flittard, Germany, Hans-Georg Schmelzer, New Martinsville, W. Va., and Walter Simmler, Odenthal-Schlinghofen, Germany, assignors to Farbenfabriken Bayer Aktiengesellschaft, Leverkusen, Germany
No Drawing. Filed Jan. 28, 1970, Ser. No. 6,576
Claims priority, application Germany, Feb. 1, 1969, P 19 05 100.4
Int. Cl. C07f 7/10, 7/18
U.S. Cl. 260—448.2 N
6 Claims

ABSTRACT OF THE DISCLOSURE

New organosiloxane- and carbamate-modified urea derivatives comprise at least one structural unit of the formula

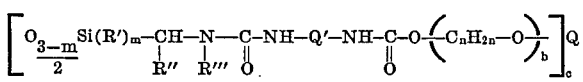

and optionally further structural units of the formula

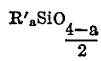

wherein however at least one of a thousand structural units corresponds to the first of the above formulae.

In these formulae R' is a monovalent hydrocarbon radical, R'' and R''' are hydrogen atoms or monovalent hydrocarbon radicals, Q' is a bivalent hydrocarbon radical, Q is a monovalent to hexavalent hydrocarbon radical, $m$ is 0, 1 or 2, $n$ is 2, 3 or 4, $a$ is 0, 1, 2 or 3, $b$ is zero or an integer from 1 to 200, and $c$ is the valency number of Q.

These urea derivatives are prepared either by hydrolyzing a corresponding alkoxysilyl-substituted carbamate-modified urea derivative, optionally in admixture with hydrocarbon-substituted alkoxysilanes, or by reacting a corresponding aminoalkyl-substituted polysiloxane with an isocyanate-modified carbamic acid ester of the formula

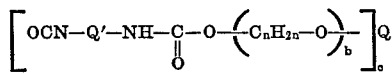

The products are to be used as priming agents imparting adhesion to synthetic resins on siliceous surfaces, as surfactants and as intermediates for organo-polysiloxane resins.

---

The present invention relates to new carbo-functional organosiloxane compounds and to processes for their production.

These compounds can be regarded as urea derivatives and, in particular, as siloxane-modified and, as well, carbamate-modified urea derivatives which comprise at least one structural unit of the general formula

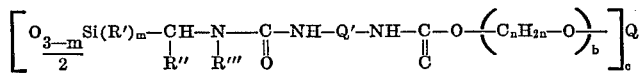

and further structural units, each of which can individually correspond either to the above formula or, up to a total of less than a thousand times the number of units of said formula, to the general formula

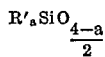

In these formulae, and also in all subsequent formulae,

R' is an optionally halogen-substituted or cyano-substituted alkyl, cycloalkyl or aryl radical having up to 10 carbon atoms, R'' is a hydrogen atom or a methyl or phenyl radical, R''' is a hydrogen atom or an optionally halogen-substituted or cyano-substituted alkyl, cycloalkyl or aryl radical having up to 10 carbon atoms, Q' is an alkylene radical having 2 to 10 carbon atoms, a cycloalkylene, arylalkylene, arylene or alkylarylene radical having up to 10 carbon atoms or an arylene radical which is derived from diphenylmethane by the removal of two hydrogen atoms, Q is a monovalent to hexavalent saturated aliphatic hydrocarbon radical having up to 6 carbon atoms, $m$ is 0, 1 or 2, $n$ is 2, 3 or 4, $a$ is 0, 1, 2 or 3, $b$ is zero or an integer from 1 to 200, and $c$ is the valency number of Q, with these radicals and numerical values being selected independently of one another at any point of a molecule.

These compounds are suitable for use as adhesion-promoting intermediate layers on siliceous surfaces which shall be coated with plastics, and also as interface-active agents and as intermediates for the manufacture of organosiloxane resins. Their urea grouping and also their carbamate grouping impart to them a certain polarity and hence, in comparison to the non-functional organosilicon compounds, result in a reduction of the occasionally disadvantageous solubility in non-polar solvents. Furthermore their viscosity, caused by the urea grouping, is relatively high, which is desirable for several organopolysiloxane resins.

The present invention also provides a process for the production of these compounds, in which a silyl-substituted urea derivative of the general formula

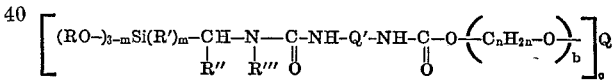

in which, as also in the subsequent formulae, R is an alkyl or cycloalkyl radical having up to 6 carbon atoms or a phenyl radical, or a mixture of such derivatives, or a mixture of these derivatives with compounds of the general formula R'$_a$Si(—OR)$_{4-a}$, for example dimethyl-diethoxysilane or trimethylmethoxysilane, is reacted, at a temperature between 20° and 100° C., preferably between 50° and 100° C., with at least half a mol of water per gram equivalent of the RO— radicals until they have been completely hydrolyzed.

Alternatively, the compounds of the invention may be made by a process in which an aminoalkyl-substituted polysiloxane which consists of at least one structural unit of the general formula

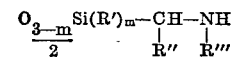

and further structural units, each of which individually corresponds either also to this formula or, up to a total of less than a thousand times the number of units of this formula to the general formula

is reacted with an isocyanate-modified carbamic acid ester of the general formula

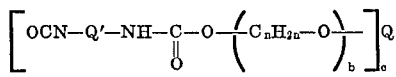

at a temperature between −20° and 150° C., preferably between 20° and 60° C., optionally in the presence of a diluent.

For the hydrolytic reaction first mentioned above it is advantageous to use 0.01 normal to 1 normal aqueous hydrochloric acid instead of pure water for accelerating the reaction, and to use up to three times the minimum amount thereof. Instead of the hydrochloric acid it is also possible to use other acids but if these are of low volatility they must be neutralized, before isolation of the reaction product, by means of a base, for example aqueous or alcoholic sodium hydroxide solution, ammonia or an amine. The hydrolysis can also be carried out in the presence of a solvent as sometimes usual for such hydrolytic reactions, such as ethanol, toluene, tetrahydrofuran or dioxane. After completion of the reaction and, if necessary, neutralization, the product is freed of the volatile components such as alcohol, excess water or acid by heating the reaction mixture under reduced pressure, and of salt which may have precipitated during the neutralization by filtration or by centrifuging.

The silyl-substituted urea derivatives which are to be subjected to the hydrolysis are obtained, according to a process described in our copending patent application Ser. No. 880,430 filed Nov. 26, 1969, by reacting an aminoalkylsilane derivative of the general formula

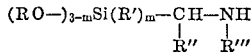

with an isocyanate-modified carbamic acid ester of the general formula

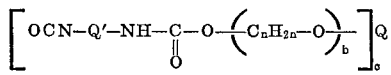

at a temperature between −20° and 150° C., optionally in the presence of a diluent.

This reaction in general proceeds exothermically; if necessary, its course can be moderated by cooling and the completion of the reaction accelerated by warming if it subsides. Suitable diluents are both inert solvents such as cyclohexane or toluene, and also alcoholic hydroxyl compounds, including higher molecular hydroxyl compounds, and mixtures of these kinds. The hydroxyl compounds can be used for the dilution because isocyanates are known to react considerably more rapidly with amines than with alcohols. If a non-volatile higher molecular hydroxyl compound has been chosen as the diluent, especially, for example, a polyalkylene glycol monoalkyl ether of the general formula

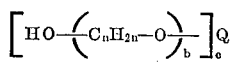

it is frequently advantageous to leave this polyether in the reaction product. If, on the other hand, a volatile solvent has been used for the dilution, then this is, as a rule, removed from the reaction product by distillation, in some cases advantageously in a thin layer evaporator.

For the alternative process for the preparation of the compounds of the invention which has been mentioned, aminoalkyl-substituted polysiloxanes are used, such as are obtainable according to known methods, for example by hydrolysis and condensation of corresponding alkoxysilanes of the general formula

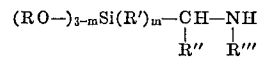

or of mixtures of these alkoxysilanes and those of the general formula

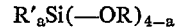

In those cases where, per hundred structural units of the process product, a number of 70 or more are to be units of the general formula

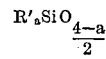

the method in which the halogenalkyl-substituted polysiloxanes consisting of structural units of the general formulae

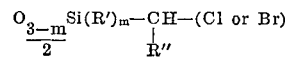

and

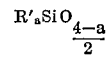

are reacted with an amine of formula $R'''NH_2$ to give the corresponding aminoalkyl-substituted polysiloxanes is furthermore to be recommended. It is known that the above mentioned aminoalkylsilane derivatives of the general formula

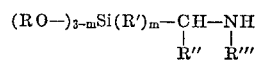

are also obtained in an analogous manner. For this purpose, it is advantageous in all these cases to choose primary amines with boiling points about 40° C. such as cyclohexylamine or isobutylamine, which are preferably used in a five-fold to ten-fold excess and which then serve as reaction components for the product which is to be obtained and at the same time as acid-binding agents and diluents. The reaction is then allowed to take place at a temperature between 20° and 150° C., preferably between 50° and 120° C., and after filtering off the ammonium halide which has precipitated and removing excess amine and other easily volatile constituents from the filtrate by distillation, the aminoalkylsilicon compounds are obtained as the residue.

The isocyanate-modified carbamic acid esters to be used in the various embodiments of the process according to the invention which have been described above are obtained according to known processes by reaction of diisocyanates, for example toluylene-diisocyanate-(2,4) or hexamethylene-diisocyanate, with hydroxyl compounds of formula

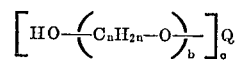

wherein the diisocyanate is preferably employed in a considerable excess, so that the number of OCN— groups in the initial reaction mixture is four to six times the number of HO— groups, and the diisocyanate remaining at the end of the reaction is removed by distillation, here again advantageously in a thin layer evaporator.

The present invention is illustrated in and by the following examples.

EXAMPLE 1

3 cm.³ of normal aqueous hydrochloric acid are added to 80 g. (0.044 mol) of a silyl-substituted urea derivative of the formula

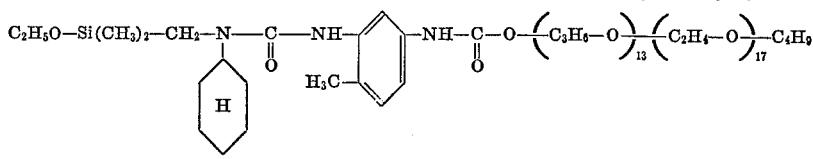

and this mixture is heated to 100° C. for 4 hours in order to effect hydrolysis. Thereafter the easily volatile constituents are removed at the same temperature whilst reducing the pressure to 1 mm. Hg and a clear, water-soluble oil is obtained as a residue, having a composition corresponding to the formula

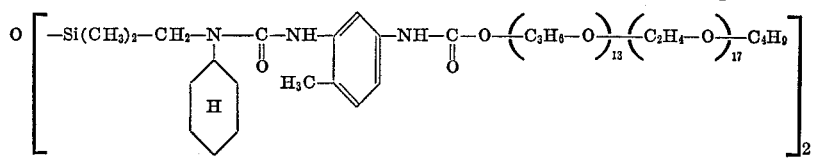

The silyl-substituted urea derivative to be used for the hydrolytic reaction according to this example can be manufactured as follows:

(a) 2376 g. (24 mols) cyclohexylamine are heated to 60° C. and 748 g. (4 mols) dimethyl-(bromomethyl)-ethoxysilane are added dropwise thereto whilst stirring; in the course of this, the reaction temperature is kept at between 70° and 80° C. Thereafter the reaction mixture is heated for a further 2 hours to 100° C. and after cooling the precipitated amine salt is filtered off. Fractional distillation of the filtrate at 15 mm. Hg and between 110° and 115° C. yields the N-cyclohexyl-(aminomethyl)dimethylethoxysilane of the formula

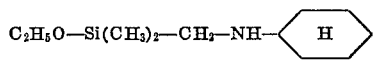

having a refractive index $n_D^{20}=1.4510$.

(b) 3000 g. of an anhydrous polyalkylene glycol monobutyl ether which is manufactured in a known manner by oxalkylation of 1 mol n-butanol firstly with 17 mols ethylene oxide and thereafter with 13 mols propylene oxide, and which has an average molecular weight of 1550, are mixed at 20° to 25° C. with 1740 g. (10 mols) toluylene-diisocyanate-(2,4) and the mixture is heated for 5 hours at 70° C. The reduction product is then freed of the excess toluylene-diisocyanate by, if necessary repeated, thin layer distillation at 0.1 to 0.2 mm. Hg and 150° C. A light yellow oil is obtained as the residue, without significant loss in yield, the composition of the oil corresponding to the formula

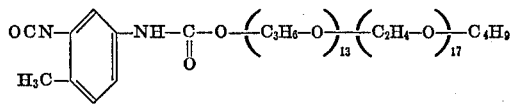

Its content of OCN— groups is 2.62 percent by weight and its average molecular weight is 1605 g.

161 g. (0.1 mol) of this isocyanate-modified carbamic acid ester are mixed with 21.5 g. (0.1 mol) of the N-cyclohexyl-(aminomethyl)dimethylethoxysilane described under (a) and the mixture is stirred for 20 hours, in the course of which the temperature transiently rises up to 45° C. The product which is present at the end of the reaction is a light yellow clear viscous oil which is soluble in water and has a composition corresponding to the formula given at the beginning of the example.

EXAMPLE 2

10 cm.³ of water are added 133.5 g. (0.05 mol) of a silyl-substituted urea derivative of the formula

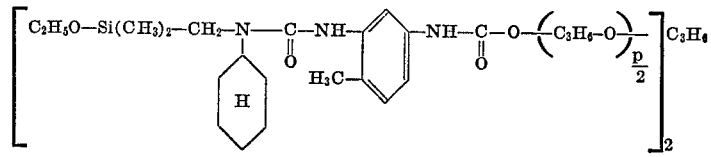

with p on average=28.4, and the mixture is stirred for 2 hours to complete the hydrolysis reaction. Thereafter easily volatile constituents are removed by heating to at most 80° C. under 0.5 mm. Hg and as the product of the siloxane condensation a clear highly viscous residue is obtained, consisting of structural units which on average corresponding to the formula

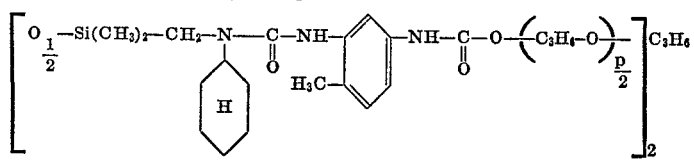

The silyl-substituted urea derivative to be used according to this example can be obtained in the following manner:

1000 g. of a polypropylene glycol manufactured in a known manner by oxalkylation of 1 mol 1,2-dihydroxypropane with 28.4 mols propylene oxide having an average molecular weight of 2000, are mixed with 522 g. (3 mols) toluylene-diisocyanate-(2,4) and the mixture is heated for 6 hours to 70° C. The reaction mixture is then freed of excess toluylene-diisocyanate in a thin layer evaporator at 0.2 mm. Hg and 150° C. The composition of the residue corresponds to the formula.

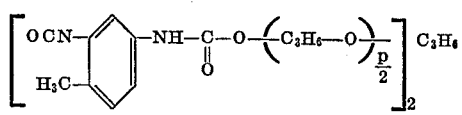

with p on average=28.4. Its content of OCN— groups is 3.75 percent by weight, and its equivalent weight is hence 1120 g. 112 g. (0.1 gram equivalent) of this isocyanate-modified carbamic acid ester are mixed with 21.5 g. (0.1 mol) of the N-cyclohexyl-(aminomethyl)-dimethylethoxysilane described in the appendix to Example 1 under (a), in the course of which the temperature rises to 40° C., and the mixture is stirred for one hour to complete the addition reaction. The urea derivative thereby formed can be directly subjected to the hydrolysis and condensation described in the example.

EXAMPLE 3

77.3 g. (0.1 gram equivalent) of an aminoalkyl-substituted polysiloxane of the formula

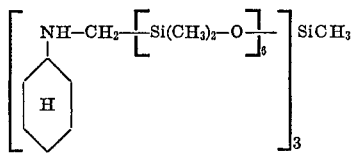

are dissolved in 150 cm.³ anhydrous toluene, and a solution of 158.5 g. (0.1 mol) of an isocyanate-modified carbamic acid ester of the formula

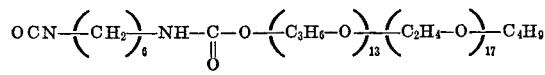

in 150 cm.³ anhydrous toluene are added dropwise to this solution whilst stirring, during the course of about one hour. The reaction mixture is stirred for a further 12 hours at room temperature and the solvent is then distilled therefrom under reduced pressure. The residue is a siloxane-modified urea derivative of good solubility in cold water, of which the viscosity is about 20,000 cps. at 25° C. and of which the composition corresponds to the formula

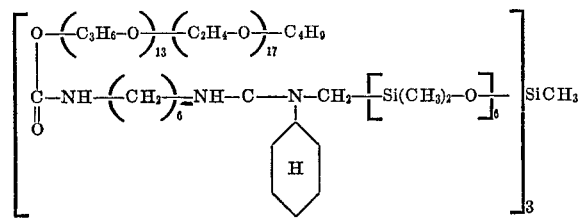

The aminoalkyl-substitutued polysiloxane to be used for this reaction can be manufactured as follows:

A mixture of 99 g. (0.6 mol) methyltrichlorosilane, 1548 g. (12 mols) dimethyldichlorosilane and 375 g. (2 mols) dimethyl-(bromomethyl)-chlorosilane is allowed to run dropwise during the course of one hour into 4 litres of water to effect the hydrolysis and siloxane condensation, and the polysiloxane phase thereby formed is separated off after cooling and then mixed with 30 g. hydrogen-montmorillonite as an equilibration catalyst. This mixture is heated to 150° C. under a reflux condenser equipped with a water separator and is stirred at this temperature, with simultaneous introduction of nitrogen, until no further water condenses in the separator. Thereafter heating is continued for a further 5 hours at 150° C.; after cooling, the reaction mixture is filtered. The filtrate obtained is a polysiloxane of the formula

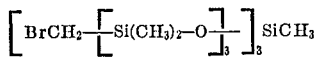

containing 12.3 percent by weight of bromine in $BrCH_2-$ groups.

500 g. thereof, containing 0.77 gram atom of Br, are mixed with 410 g. (4.15 mols) cyclohexylamine and the mixture is heated for 3 hours to a temperature of between 100° and 120° C. It is then cooled to a temperature of between 0° and 5° C., and the cyclohexylammonium bromide which has precipitated is filtered off and rinsed with 100 cm.³ cyclohexylamine. Volatile constituents are distilled from the filtrate, initially at 13 mm. Hg and at most 120° C., and the remaining volatile constituents are removed from the residue in a thin layer evaporator at a pressure of between 0.5 and 1 mm. Hg and at 130° C. Small further amounts of ammonium salt which have precipitated in the course thereof are removed by renewed filtration. A filtrate is obtained which in addition to 0.1 percent by weight of tertiary-bonded nitrogen contains 1.81 percent by weight of nitrogen in its secondary cyclohexyl-aminomethyl groups and which is to be reacted in accordance with the example with the isocyanate-modified carbamic acid ester mentioned therein.

This ester can be manufactured as follows:

3000 g. of an anhydrous polyalkylene glycol monobutyl ether which is manufactured in a known manner by oxalkylation of 1 mol n-butanol firstly with 17 mols ethylene oxide and further with 13 mols propylene oxide, and having an average molecular weight of 1550, are mixed at 20° to 25° C. with 1680 g. (10 mols) hexamethylene-diisocyanate and the mixture is heated to 90° C. for 20 hours. The reaction product is then freed of the excess hexamethylene-diisocyanate by, if necessary repeated, thin layer distillation at 0.1 to 0.2 mm. Hg and 150° C. An isocyanate-modified carbamic acid ester of the formula indicated in the example is obtained as a pale yellow oily residue, without significant loss of yield. Its content of OCN— groups is 2.55 percent by weight and its average molecular weight is 1585.

EXAMPLE 4

68.9 g. (0.1 gram equivalent) of an aminoalkyl-substituted polysiloxane of the formula

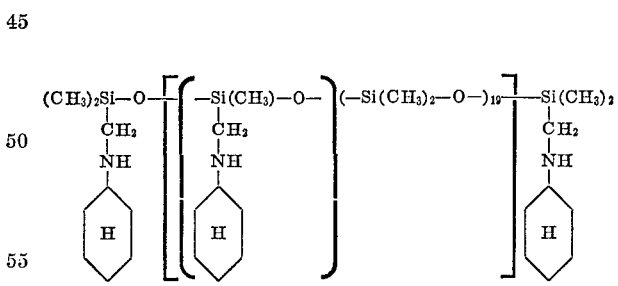

are reacted, in a manner analogous to that described in Example 3, with 158.5 g. (0.1 mol) of the isocyanate-modified carbamic acid ester used in Example 3. The highly viscous residue which finally remains after distilling off the solvent is also easily soluble in cold water; its composition essentially corresponds to the formula

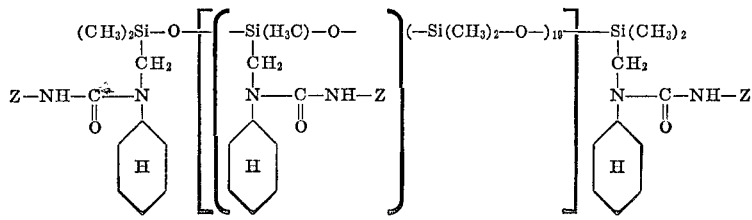

wherein —Z denotes the radical

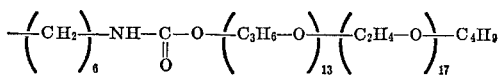

The aminoalkyl-substituted polysiloxane to be used in this example can be manufactured as follows, analogously to the process described in the appendix to Example 3:

A mixture of 1960 g. (15.2 mols) dimethyldichlorosilane, 166.5 g. (0.8 mol) methyl-(bromomethyl)-dichloro-silane and 300 g. (1.6 mols) dimethyl-(bromomethyl)-chloro-silane is added dropwise during the course of one hour to 4 litres of water to effect the hydrolysis and siloxane condensation, and the polysiloxane phase thereby formed is separated off under cooling and then mixed with 40 g. hydrogen-montmorillonite as an equilibration catalyst. This mixture is heated to 150° C. under a reflux condenser provided with a water separator and stirred at this temperature, with simultaneous introduction of nitrogen, until no further water condenses in the separator. Thereafter heating is continued at 150° C. for a further 5 hours; after cooling, the reaction mixture is filtered, and a polysiloxane of the formula

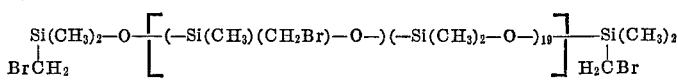

containing 12.5 percent by weight of bromine in BrCH$_2$— groups is obtained as the filtrate.

1134 g. thereof, containing 1.77 gram atoms of Br, are mixed with 990 g. (10 mols) cyclohexylamine and in other respects the procedure previously described is followed. The polysiloxane obtained after the last filtration contains, in addition to 0.1 percent by weight of tertiary-bonded nitrogen, 2.03 percent by weight of nitrogen in its Si-bonded secondary cyclohexylaminomethyl groups; its composition on average corresponds to the formula given at the beginning of the example.

What we claim is:
1. Siloxane-modified urea derivatives having at least one structural unit of the general formula

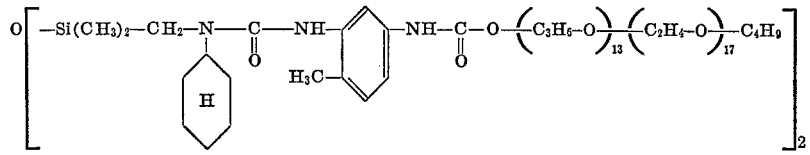

and optionally at least one further structural unit each of which is individually selected from the group consisting of units corresponding to the above formula and, up to a total of less than a thousand times the number of units of said formula, of units corresponding to the general formula $$R'_aSiO_{\frac{4-a}{2}}$$

in which formulae

R' is a radical having up to 10 carbon atoms, selected from the group consisting of alkyl, cycloalkyl, aryl, halogenated alkyl, cycloalkyl and aryl, and cyano-substituted alkyl, cycloalkyl, and aryl, R" is selected from the group consisting of a hydrogen atom, a methyl radical and a phenyl radical, R''' is selected from the group consisting of a hydrogen atom and a radical having up to 10 carbon atoms, said radical being selected from the group consisting of alkyl, cycloalkyl, aryl, halogenated alkyl, cycloalkyl and aryl, and cyano-substituted alkyl, cycloalkyl and aryl, Q' is a bivalent hydrocarbon radical selected from the group consisting of alkylene having 2 to 10 carbon atoms, cycloalkylene, arylalkylene, arylene and alkylarylene, each of them having up to 10 carbon atoms, and arylene derived from diphenylmethane by the removal of two hydrogen atoms, Q is a monovalent to hexavalent saturated aliphatic hydrocarbon radical having up to 6 carbon atoms, $m$ is selected from 0, 1 and 2, $n$ is selected from 2, 3 and 4, $a$ is selected from 0, 1, 2 and 3, $b$ is selected from 0 and the integers from 1 to 200, and $c$ is the valency number of Q, the above defined radicals and numerical values being selected independently of one another at any point of a molecule.

2. A compound according to claim 1, having the formula

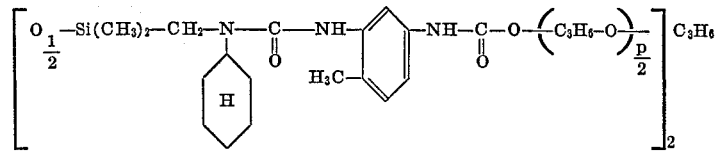

3. A compound according to claim 1, having polymer segments of the formula

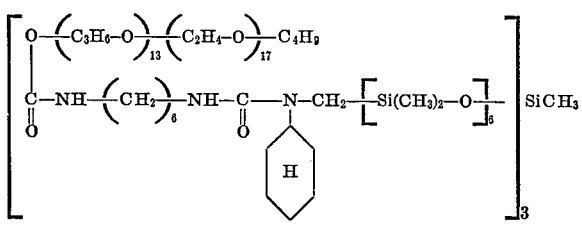

$p$ being, on average, equal to 28.4.

4. A compound according to claim 1, having the formula

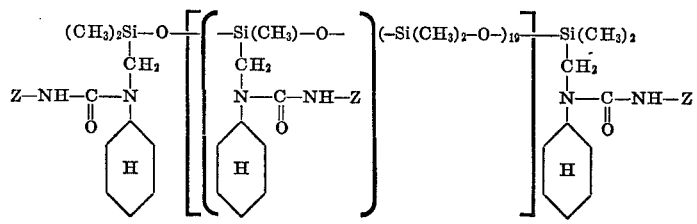

5. A compound according to claim 1, having the formula wherein —Z denotes the radical
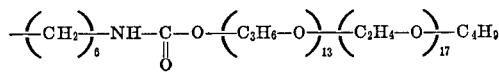
6. Compound according to claim 1, wherein $m$ is selected from 1 and 2, and $a$ is selected from 1, 2, and 3.
References Cited
UNITED STATES PATENTS
| 3,208,971 | 9/1965 | Gilkey et al. | 260—448.2 N X |
|---|---|---|---|
| 3,361,783 | 1/1968 | Fink | 260—448.2 N |
| 3,506,701 | 4/1970 | DiPaola | 260—448.2 N |
| 3,346,609 | 10/1967 | Klebe | 260—448.2 N |
| 3,172,784 | 3/1965 | Klebe | 260—448.2 N X |
| 3,049,559 | 8/1962 | Montgomery | 260—448.2 N |
| 2,966,507 | 12/1960 | Montgomery | 260—448.2 N |
| 2,907,782 | 10/1959 | Pike | 260—488.2 N |
DELBERT E. GANTZ, Primary Examiner
P. F. SHAVER, Assistant Examiner
U.S. Cl. X.R.
117—123 C; 252—357; 260—46.5 E, 448.2 E, 448.2 B, 448.8 R, 824 R, 825

UNITED STATES PATENT OFFICE
CERTIFICATE OF CORRECTION

Patent No. 3,657,303    Dated April 18, 1972

Inventor(s) Hans Dietrich Golitz et al.

It is certified that error appears in the above-identified patent and that said Letters Patent are hereby corrected as shown below:

1. Col. 4, line 43, "about 40°C." should be --above 40°C.--.

2. Col. 6, line 1 of Example 2, after "added" insert --to--.

3. Col. 7, line 40, change the formula to:

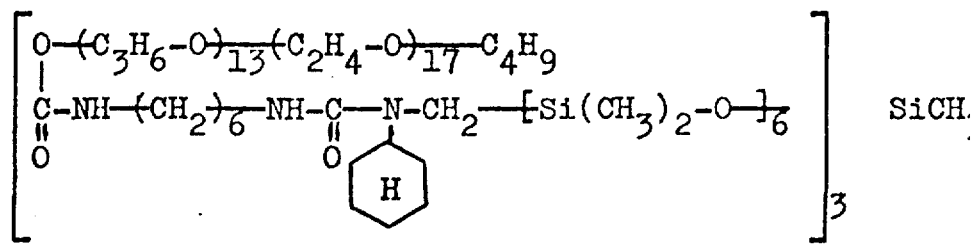

4. Col. 9, line 14, "under" should be --after--.

5. Col. 9, line 55, (claim 1, line 3), change the formula to:

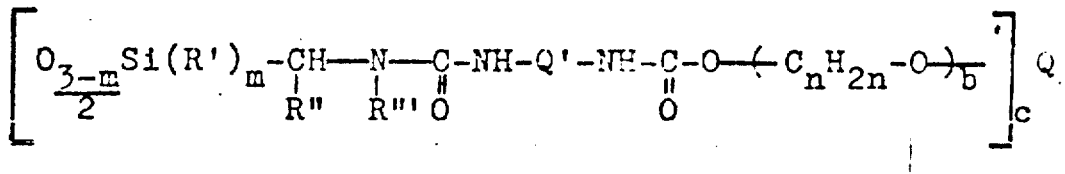

6. Col. 11, line 10, in the reference to Gilkey, "448.2 N X" should be --448.2 NXR--.

7. Col. 12, line 2, 2nd reference to Klebe, "3,172,784" should be --3,172,874--, and "260.448.2 N X" should be --260.448.2 NXR--.

Signed and sealed this 26th day of September 1972.

(SEAL)
Attest:

EDWARD M. FLETCHER, JR.
Attesting Officer

ROBERT GOTTSCHALK
Commissioner of Patents